(12) United States Patent
Peterson

(10) Patent No.: US 8,257,764 B2
(45) Date of Patent: Sep. 4, 2012

(54) RUMINANT MINERAL FEED ADDITIVE

(75) Inventor: Stephen L. Peterson, Peralta, NM (US)

(73) Assignee: Zeotech Corporation, Fort Worth, TX (US)

( * ) Notice: Subject to any disclaimer, the term of this patent is extended or adjusted under 35 U.S.C. 154(b) by 200 days.

(21) Appl. No.: 12/478,542

(22) Filed: Jun. 4, 2009

(65) Prior Publication Data

US 2010/0310723 A1  Dec. 9, 2010

(51) Int. Cl.
*A23K 1/175*  (2006.01)
(52) U.S. Cl. ......... 426/74; 426/271; 426/285; 426/807
(58) Field of Classification Search .............. 426/74, 426/271, 285, 807
See application file for complete search history.

(56) References Cited

U.S. PATENT DOCUMENTS

| | | | | |
|---|---|---|---|---|
| 731,461 A | * | 6/1903 | Jarecki | 71/14 |
| 3,784,392 A | * | 1/1974 | Bertorelli | 106/468 |
| 3,816,149 A | * | 6/1974 | Zettel | 106/699 |
| 3,983,255 A | * | 9/1976 | Bass | 426/54 |
| 4,131,638 A | * | 12/1978 | Whitaker et al. | 264/333 |
| 4,283,423 A | * | 8/1981 | Watkins et al. | 426/69 |
| 4,594,466 A | * | 6/1986 | Reeves | 568/919 |
| 4,904,473 A | | 2/1990 | Schricker et al. | |
| 4,976,963 A | | 12/1990 | Schricker et al. | |
| 4,996,065 A | * | 2/1991 | Van de Walle | 426/72 |
| 5,079,201 A | | 1/1992 | Chu et al. | |
| 5,264,227 A | | 11/1993 | Laroche et al. | |
| 5,858,424 A | * | 1/1999 | Virkki et al. | 426/54 |
| 5,908,634 A | | 6/1999 | Kemp et al. | |
| 6,238,727 B1 | | 5/2001 | Takemoto et al. | |
| 6,306,427 B1 | * | 10/2001 | Annonier et al. | 424/438 |
| 6,451,361 B1 | | 9/2002 | Moore | |
| 7,011,826 B1 | | 3/2006 | Rowe et al. | |
| 7,271,158 B2 | | 9/2007 | Banks et al. | |
| 2005/0163911 A1 | * | 7/2005 | McGowen et al. | 426/630 |
| 2007/0128334 A1 | * | 6/2007 | Pittman | 426/623 |
| 2008/0089998 A1 | * | 4/2008 | Chou | 426/635 |

FOREIGN PATENT DOCUMENTS

| | | |
|---|---|---|
| CA | 939186 | 1/1974 |
| WO | WO 2004020367 A1 * | 3/2004 |

OTHER PUBLICATIONS

Mumpton et al. J. Anim. Sci., vol. 45, No. 5, pp. 1188-1203, 1977.*
Hubert Olbrich, "The Molasses", published 2006, pp. 1-131, downloaded from http://www.btkempe.de/.*
1 page downloaded from http://en.wikipedia.org/wiki/Dunder on Dec. 4, 2011.*
4 pages downloaded from http://en.wikipedia.org/wiki/Bagasse on Dec. 4, 2011.*
Sheila E. Scheideler, Efficacy of Various Aluminosilicates as an Affinity Sorbent for Mycotoxins, 1993.
T.C. Schell, Effectiveness of Different Types of Clay for Reducing the Detrimental Effects of Aflatoxin-Contaminated Diets on Performance and Serum Profiles of Weanling Pigs, Journal of Animal Science, 1993, vol. 71, pp. 1226-1231.
Material Safety Data Sheet for Dolomitic Hydrated Lime, Sep. 2006, pp. 1-8, Graymont Dolime, Inc., Genoa, Ohio.

* cited by examiner

*Primary Examiner* — Chhaya Sayala
(74) *Attorney, Agent, or Firm* — James E. Walton; Richard G. Eldredge

(57) ABSTRACT

A ruminant mineral feed additive for dairy cattle and ruminant animals includes a unique combination of zeolite and dolomitic hydrate mineral fines that are prilled and hydrothermally reacted to produce a valuable dietary supplement for control of acidosis.

17 Claims, 4 Drawing Sheets

RUMINANT MINERAL FEED ADDITIVE

BACKGROUND

1. Field of the Invention

The present application relates to feed additives for ruminant animals.

2. Description of Related Art

It has long been known to provide additives in the feed of ruminant animals such as cattle, sheep, and goats to improve the rumen (first stomach) function, particularly for ruminant animals that are fed high levels of concentrated grain diets to increase milk production in milk-producing animals and improve meat conversion in meat animals.

Ruminant animals have a unique digestive system. Microorganisms found in the rumen allow the animals to manufacture protein amino acid from the fermentation of forage and grains. Byproducts from the fermentation process are volatile fatty acids (VFA) and ammonium ions (ammonia). VFA and ammonia are essential in the digestive process. They form the building blocks for protein synthesis and utilization of nutrients for the proper metabolic processes of the animal. However, in elevated quantities, either of these two products impair the efficiency of rumen digestion and can even cause the death of the animal. Ailments related to acid imbalance are acidosis, rumenitis, laminitis, anorexia and liver abscess. Ammonia, which is produced naturally by the rumen microorganisms, is utilized to synthesize cellular protein. When high levels of ammonia occur, the acid-base balance of the blood changes and toxic symptoms such as incoordination, labored breathing, and convulsions may affect the animal. The animal's natural mechanism to regulate rumen pH is the secretion of saliva containing sodium bicarbonate and potassium bicarbonate.

Current herd management techniques stress the feeding of high levels of concentrated grain diets. However, the large quantities of highly fermentable grains lead to rapid production of VFA's and to decreased production of saliva. Acid buffering of animal feed by the addition of sodium bicarbonate, sodium sesquicarbonate, dolomite, or magnesium oxide, then, is common practice.

Sodium bicarbonate and sodium sesquicarbonate are effective pH buffers in aqueous solutions, but they have several drawbacks in the rumen system. They are water soluble and may be flushed out of the rumen before the typical 14-hour to 16-hour rumen turnover time. Additionally, bicarbonate flushed through the intestinal tract is not sufficient to deal with the large volume of acid digestia leaving the abomasum. Also, some nutritionists claim that the palatability of feed is reduced by the addition of sodium bicarbonate. The high sodium content of these two products may stress the cardiovascular system by increasing central venous pressure resulting in hypertension. A much less expensive source of dietary sodium is available for rations with sodium chloride (NaCl, table salt). Sodium bicarbonate and sodium sesquicarbonate generate carbon dioxide gas as they decompose in the rumen and neutralize acid. The carbon dioxide gas passes out of the rumen, through the animal's esophagus to the environment. Carbon dioxide is a greenhouse gas and its emission is being considered for regulation by some governmental agencies. Additionally, sodium bicarbonate is a manufactured product that requires considerable energy and cost to produce.

Dolomite (calcium, magnesium limestone) is an effective, natural mineral buffer at low pH, but its activity decreases above pH 5.6. Optimal rumen pH is 6.1 to 6.8. Dolomite is also a carbonate and it produces carbon dioxide as it neutralizes acid in the animal.

Magnesium oxide in feed rations at the proper dose provides bio-available magnesium to the animal and can be an important nutrient source. Certain grades of non-refractory magnesium oxide are also good pH buffers for control of excess rumen acid. Animal feed grade magnesium oxides generally are produced from natural brines or by calcining natural magnesite (magnesium carbonate). These processes are energy intensive and expensive. Feed grade magnesium oxide generally costs two to three times more than sodium bicarbonate, and costs four to six times more than feed grade dolomite. Commercial practice is to minimize the use of expensive magnesium oxide. Other less expensive sources of bio-available magnesium are in demand.

Although sodium bicarbonate, sodium sesquicarbonate, and magnesium oxide in proper doses buffer the rumen from acidosis (high acid, low pH), they do not control excess ammonia produced by the microorganisms, nor do they reduce the negative affect of mold toxins (mycotoxins) that may occasionally occur in feed rations.

Products currently used to control ammonia toxicity are ion exchange materials such as synthetic and natural zeolites.

White, et. al., Canadian Patent No. 939,186, issued Jan. 1, 1974 teaches the use of zeolites to reduce the effects of high ammonium production in the rumen when animals were fed urea or non-protein nitrogen compounds.

Chu, et. al., U.S. Pat. No. 5,079,201, issued Jan. 7, 1992, describes a composition of clay and zeolite for the absorption of ammonium ions in order to lower the amount of ammonia passed to the liver from the alimentary canal.

Coincidentally, it has been found that certain naturally occurring zeolites absorb and bind aflatoxin and other mycotoxins present in mold contaminated feeds and are therefore beneficial as feed additives.

Scheidler, S., 1993, Effects of Various Types of Alumino-Silicates and Aflatoxin B, Chick Performance and Mineral Studies, Poultry Sci., 72:282-288 teaches that certain natural zeolite minerals and other alumino-silicates reduce the negative effects of poultry fed a diet containing mycotoxin (Aflatoxin B).

Schell, et. al., 1993, Effectiveness of Different Types of Clay for Reducing the Detrimental Effects of Aflatoxin-Contaminated Diets on Performance and Serum Profiles of Weanling Pigs, J. Animal Sci. 71:1226-31 teaches that certain absorptive clays and at least one natural zeolite added to feed rations overcome the negative effects of feed containing aflatoxin as a contaminant.

Dolomitic hydrated lime, also know as Type-S lime, dolomitic hydrated lime, or calcium-magnesium lime hydrate, is a common industrial product presently used in cement plaster formulations and to neutralize acidic wastes. Dolomitic hydrated lime is not known to be used in animal feed rations. The taste is sharp or bitter, as is the case with many calcined lime products or their derivatives, and attempts to feed it in the past have resulted in adverse conditions of reduced feed intake, loose stools, or diarrhea. Indeed, the Material Safety Data Sheet published by Graymont Dolime, Inc. of Genoa, Ohio in September 2006 for dolomitic hydrated lime warns of exposure from contact causing severe irritation to skin, mucous membranes, and the eyes. It also warns of ingestion hazards of pain, vomiting blood, diarrhea, and collapse or drop in blood pressure.

Thus, although the foregoing products and methods represent great strides in the area of feed additives for ruminant animals, many shortcomings remain.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

The present application describes a process and a resultant composition of matter which, when fed to ruminant animals, buffers excess acid and ammonia, absorbs mycotoxins and provides dietary calcium and magnesium. The mineral components of the subject application alone and without proper ratios of use, blending, and hydrothermal processing do not have the beneficial effects that are possible when processed and prepared as described in this application. The present application involves a unique combination of natural zeolite minerals and dolomitic hydrated lime. The dolomitic hydrated lime is converted from a harsh chemical to a benign and beneficial product for animal consumption. This mixture is finely milled, blended with an aqueous solution, and prilled in a pre-determined solid-to-solid and solute ratio. A heated reaction then creates a pozzolanic reaction that exchanges magnesium ions into the zeolite molecular structure, bonds the two minerals and results in a valuable, nutritional product in a prilled form that is ideal for mixing with feedstuffs. The components of the present application are mechanically and chemically combined and prilled to produce a feed supplement for pH control in the rumen and for the lower digestive tract, bio-available calcium and magnesium, mycotoxin binding, and ammonium buffering.

In the preferred embodiment, the natural zeolite is clinoptilolite; however, it will be appreciated that a wide variety of zeolites may also be used, including phillipsite, mordenite, stilbite, chabazite, and other mineral species. In addition, it should be understood that certain alumino-silicate clays, for example smectitic clays, may be substituted for all or part of the natural zeolite component.

Figure 1:
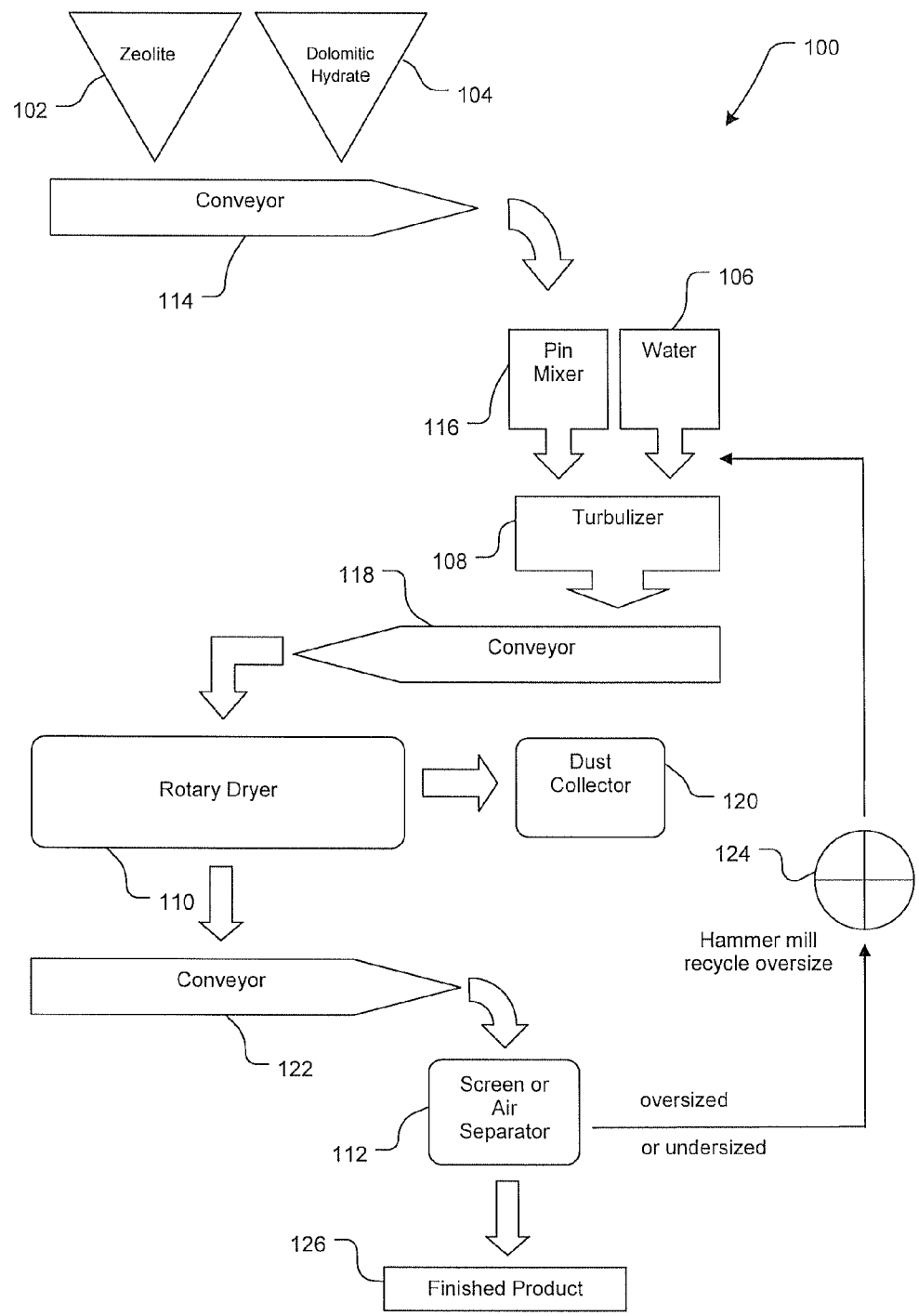
FIG. 1 is a flowchart illustrating the preferred embodiment of the process for manufacturing the ruminant mineral feed additive (RMFA) of the present application.

Referring to FIG. 1 in the drawings, a flowchart 100 depicting the preferred process of manufacturing and forming the ruminant mineral feed additive (RMFA) of the present application is illustrated. Preferred starting components are natural zeolite fines 102, dolomitic hydrated lime 104, and water 106. Preferred processing equipment are a pin agglomerator (also called a turbulizer) 108, a source of heat 110 for elevation of temperature of the mixture for process reactions and for drying of the prills, and a mechanical screen 112 or air separator for particle size classification.

In the preferred process, the natural zeolite 102 of the mineral type clinoptilolite is crushed and processed to minus 30 mesh (600 microns). Dolomitic hydrated lime 104 is produced from dolomitic lime by hydration at elevated pressure to form a very fine, dry powder product. Because the dolomitic hydrated lime 104 is a common industrial commodity, it is readily available. Crushed, minus 30 mesh zeolite is blended with dolomitic hydrated lime powder in a ratio of about 60:40. The zeolite 102 and the dolomitic hydrated lime 104 are conveyed via a conveyer 114 to a pin mixer 116. The dry mixture is introduced to the high-speed turbulizer 108 and sufficient water 106 is added to produce a well blended, wetted, prilled product. Moisture content of the wetted prill is preferably about 15 percent to about 25 percent. For utility of mixing and blending into feed rations, and to avoid segregation from feed and refusal by animals, the finished prills should ideally be between about 12 mesh (1.70 mm) nominal diameter and about 100 mesh (150 microns); however, it will be appreciated that in some applications this range may vary. For example, in alternative embodiments, the prills may be anywhere in the range from about 325 mesh, or smaller, up to 12 mesh, or even larger than 12 mesh. In addition, although in the ruminant mineral feed additive of the preferred embodiment, prills having a minus 100 mesh tend to produce undesirable dust, such small prill sizes, and even smaller, may be desirable in alternative applications.

The moist or wetted prill from the turbulizer 108 is then conveyed via a conveyor 118 to the heat source 110, where the wetted prill is heated from ambient temperature to at least 200 degrees F. for a minimum of about 4 minutes to effect a hydrothermal reaction which occurs in the following steps: (a) magnesium cation exchange onto zeolite crystalline material; (b) synthesis and growth of magnesium clinoptilolite crystals; and (c) pozzolanic annealing of solid components into a dry, rigid, semi-spherical prill. The wetted prill is dried to a moisture content of less than about 8 percent. The moisture is preferably an admixture of not less than 12 percent or more than 30 percent. The heat source 110 is preferably a rotary, hot-air dryer, fluid-bed dryer, or similar equipment. The optimum elevated temperature is about 230 degrees F. Although the preferred reaction time is about 4 minutes, it will be appreciated that the reaction time may be any amount of time up to 12 minutes, and even more, depending upon the results desired. Any dust formed during the drying process may be collected in a dust collector 120 for recycling or further processing.

The prills are then cooled and conveyed by a conveyor 122 to the screen 112, where the prills are mechanically separated by screening or air separation to the optimal particle size distribution 126. Oversized and undersized prills may be recycled via a hammer mill recycling system 124 through the production system. It will be appreciated that in an alternative embodiment, the prills of the subject application may be formed by utilizing an extruder, a mini-briquetter, or any other suitable device. In addition, in some alternative embodiments, the elevated temperature may be as high as 400 degrees F. or more depending upon the results desired.

In the preferred embodiment, the RMFA of the present application contains about 7 percent magnesium and about 12 percent calcium, and is in the form of a hard, dry, generally spherical prill with the majority of particles between about 12 mesh and about 100 mesh. In alternative embodiments, the prill size may be between about 10 mesh (2 mm) and about 150 mesh (100 microns). The RMFA is a magnesium exchanged zeolite containing original, chemically unaltered starting components that together have been densified and annealed through a pozzolanic reaction to form particles with adequate particle strength to withstand bin storage, conveying, and handling in modern feed conveyance systems without undue particle attrition. The final product preferably has an acid consuming capacity in excess of 12 milliequivalents (mEq) of hydrogen ion per gram, and a bulk density of about 50 pounds per cubic foot. When wetted and masticated by ruminant animals, the RMFA breaks down and mixes with feed particles to be a beneficial product as described herein.

Scanning electron microphotographs were made of process ingredients and finished product of the invention to determine changes in morphology, chemistry, and mineralogy.

Figure 2:
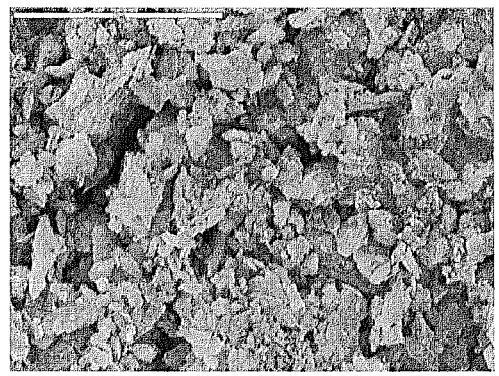
FIG. 2 is a scanning electron microphotograph of clinoptilolite zeolite crushed and sieved to a fine particle size according to the methods of the present application.

FIG. 2 is a scanning electron microphotograph that shows crushed clinoptilolite zeolite crushed and sieved to a fine particle size prior to processing. This clinoptilolite zeolite is the main ingredient in the ruminant mineral feed additive of the present application. The particles in the figure are angular to sub-angular fragments of larger crystals that have been broken down by the crushing process. The "stepped angles" on the fragments represent breakage and attrition of larger clinoptilolite crystals along cleavage planes. In FIG. 2, the bar is 10 microns.

Figure 3:
FIG. 3 is a scanning electron microphotograph of a prill according to the preferred embodiment of the present application at magnification showing spherical shape and size of approximately 1.5 mm by 1.0 mm, or about 16 mesh.

FIG. 3 is a scanning electron microphotograph of a prilled product according to the preferred embodiment of the subject application. The prill is shown at a magnification that shows a generally spherical shape and size of approximately 1.5 mm by 1.0 mm, i.e., about 16 mesh. Powder components of the formula have been combined, shaped, and chemically modified to form this unique prill. In FIG. 3, the bar is 500 microns.

Figure 4:
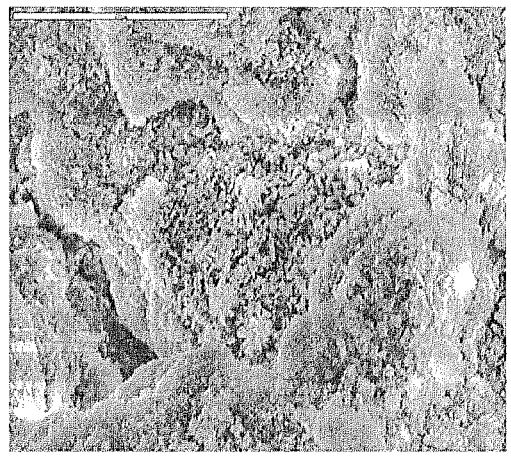
FIG. 4 is a magnified view of the scanning electron microphotograph of FIG. 3.

FIG. 4 is a magnification of the prill in FIG. 3 showing outlines of larger clasts (clumps) of initial constituents of clinoptilolite zeolite and dolomitic hydrated lime that were agglomerated to form the prill. The clasts are covered, over grown, annealed, and bound together with a mass of very fine, drussy crystallites. In FIG. 4, the bar is 20 microns.

Figure 5:
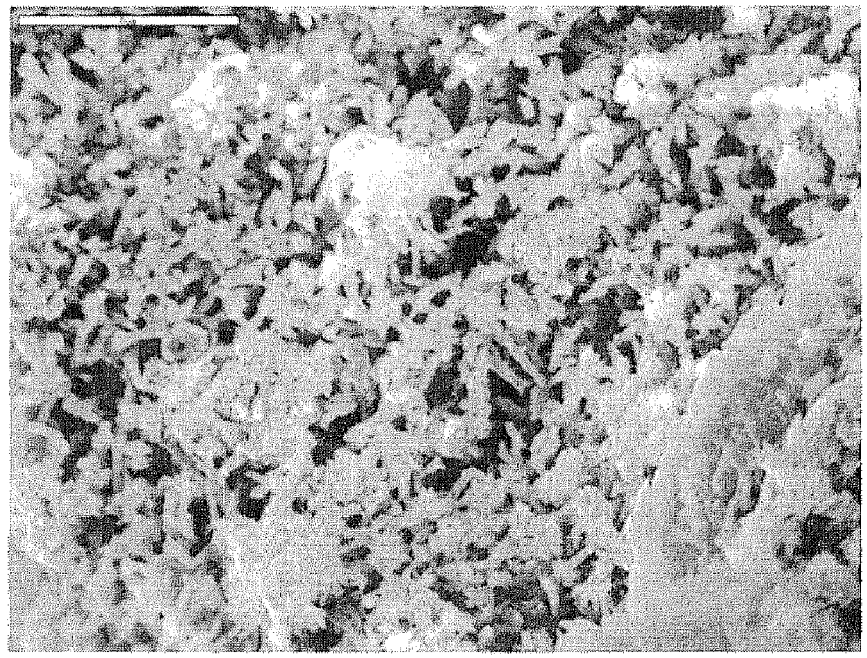
FIG. 5 is a magnified view of the scanning electron microphotograph of FIG. 3.

FIG. 5 is a further enlargement of the prill of FIG. 3. FIG. 5 shows details of the crystallite laths that form as a binding matrix and anneal the prilled granules. This view focuses on the new crystallite growth out of and around endomorphic clasts of clinoptilolite zeolite and dolomitic hydrated lime. The crystallites effectively form a matrix that lends structural strength to the particle. In FIG. 5, the bar is 5 microns.

Figure 6:
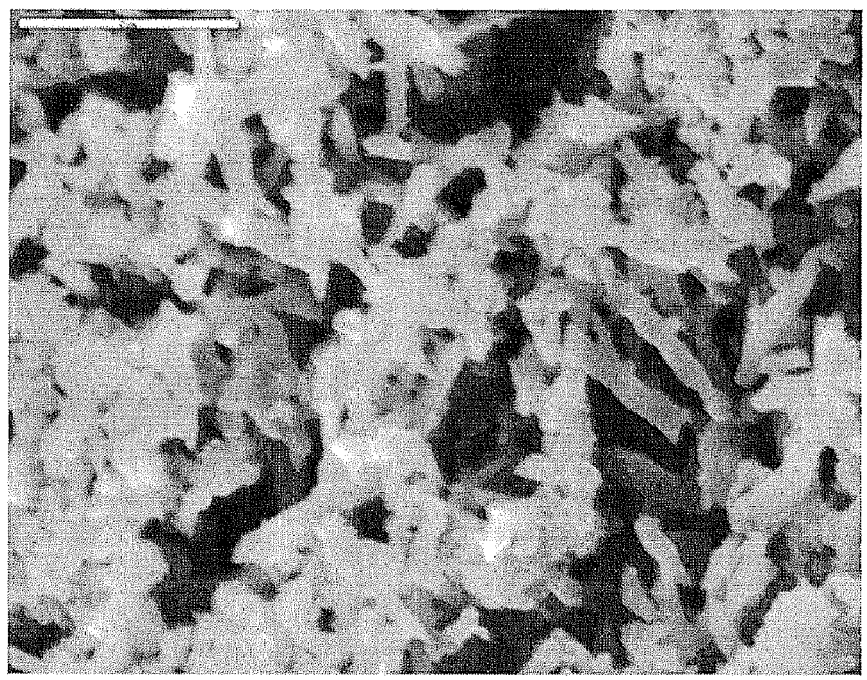
FIG. 6 is a magnified view of the scanning electron microphotograph of FIG. 3.

FIG. 6 is a further enlargement of the prill of FIG. 3. FIG. 6 shows details of new-growth crystallites forming a matrix around larger endomorphic clasts of precursor zeolite and dolomitic hydrated lime. The crystals are euhedral clinoptilolite formed by hydrothermal synthesis. In FIG. 6, the bar is 2 microns.

Figure 7:
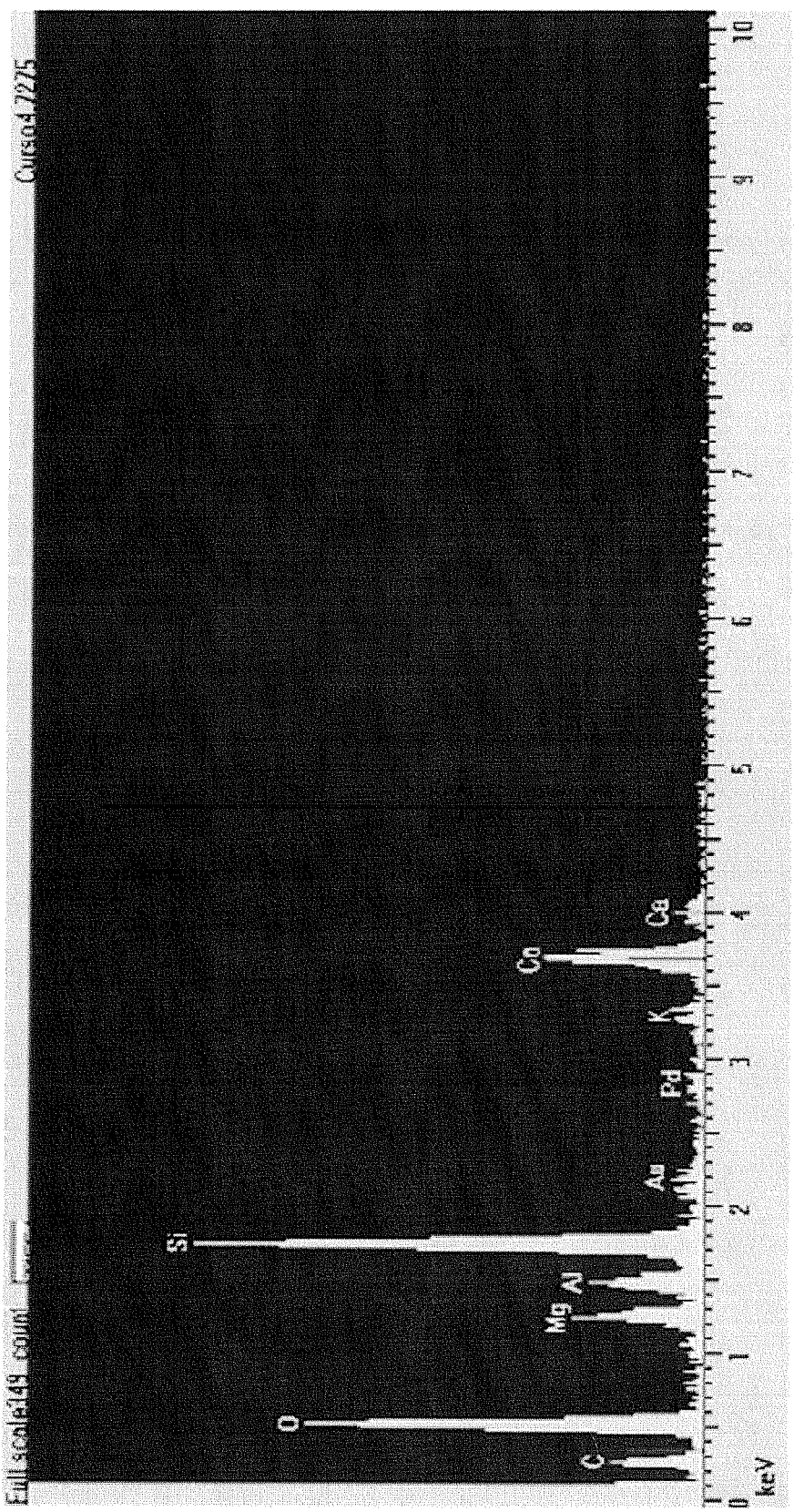
FIG. 7 is an X-ray florescence analysis of the crystallites of FIG. 6.

FIG. 7 is an X-ray fluorescence analysis of the crystallites in FIG. 6. FIG. 7 shows the chemical composition of a magnesium, calcium aluminosilicate, which is compatible with X-ray diffraction data and the hypothesis that the newly formed crystallites are magnesium, calcium clinoptilolite. This is compatible with an interpretation of magnesium/calcium clinoptilolite crystals formed as a matrix between larger clasts of original constituents.

Example No. 1

A Comparison of the Acid Consuming Capacity of the RMFA with Sodium Bicarbonate

Ruminal fluid was obtained from a lactating cow at feeding. The fluid was strained through cheese cloth and then frozen overnight to remove feed particles and destroy microbial activity. The ruminal fluid was then strained a second time, divided into 25 ml aliquots, then warmed to 30 degrees C. in a shaking water bath. Ruminal fluid was pH 6.75 at this time. Sodium bicarbonate and the ruminant mineral feed additive (RMFA) of the present application were added to 60 ml test tubes containing ruminal fluid in a 1:100 (wt./vol.) ratio. Test buffers were evaluated in quadruplicate. The test tubes were incubated in a shaking water bath at 39 degrees C. to represent normal ruminal temperature and to approximate the rolling, mixing action of the rumen. Acid consuming capacity was determined by adding 100 micro-liter aliquots of 6 N HCl to each test tube at one-half hour intervals. Solution pH was determined just before addition of the acid. Acid addition continued until pH was reduced to a value of approximately 3.5 and remained stable for 1 hour. The results of the test are set forth in Table 1. As is shown, the RMFA produced advantages in both initial and ending pH, as well as, resistance to pH change.

TABLE 1

| Measurement | Sodium Bicarbonate | RMFA |
|---|---|---|
| Initial pH without buffer | 6.75 | 6.75 |
| Initial pH with buffer | 6.97 | 7.04 |
| End pH | 3.40 | 3.43 |
| pH Change | 3.57 | 3.61 |
| mMoles HCl added | 4.95 | 5.1 |
| pH change per mMole HCl | 0.72 | 0.71 |

Example No. 2

A Pilot Production Facility was Set Up to Produce Product of the Invention

Auger feeders were set to meter minus 30 mesh clinoptilolite zeolite, 60 percent by weight with dolomitic hydrated lime at 40 percent by weight. Dry products were blended and then metered by an auger feeder into a 12-inch diameter Mars Mineral Model 12D54L pin mill with a shaft speed of 1100 RPM. Feed rate was approximately 4,000 pounds per hour. Water was added through a pressurized line and regulated with a valve. The amount of water added to the system controlled the size of the prills. Wet prills were conveyed to a direct fired, propane fueled, 36-inch diameter rotary dryer. Flame was adjusted to heat the prills to about 230 degrees F. at the discharge point. Residence time in the dryer was 6 minutes. A blower swept steam and water vapor out of the dryer at the "feed in" end of the dryer. Prilled product was screened to minus 14, plus 30 mesh size with a triple deck Tyler Hummer 4-by-8 foot screen. Finished product was placed in 2,000 pound bulk sacks for product testing and animal feed trials.

Example No. 3

A Lactating Dairy Trial was Conducted to Measure the Efficacy of the Product of the Patent on Ruminal Fermentation and Lactation Performance in Dairy Cows Experimental Total Mixed Ration (TMR) diet consisted of 37 percent alfalfa hay, 19 percent corn silage, 14 percent corn grain, and 30 percent concentrate mix. The TMR was fed ad libitum. Thirty primiparous and multiparous lactating Holstein cows (52±23 days in milk) were assigned one of three dietary treatments with 10 cows in each treatment: (1) control, which was TMR diet without ruminal buffer; (2) TMR diet with 1.4 percent sodium bicarbonate; and (3) TMR diet with 1.4 percent RMFA. The experiment was a completely randomized design performed over 12 weeks. The results of this trial are set forth in Table 2. Intake of dry matter, average 26.5 kg/d, did not differ significantly across treatments, and milk yield was similar among the three treatments. Dairy efficiency was not significantly affected by dietary treatments. Milk fat concentration did not differ significantly among treatments. However, milk protein concentration tended to be higher in the cows that received the TMR diet with RMFA, than for the control group and the group that received the TMR diet with 1.4 percent sodium bicarbonate (P=0.15). Although feeding the RMFA resulted in the tendency of increased milk protein concentration, feed nitrogen efficiency for milk nitrogen did not differ significantly among the three treatments. In addition, milk urea nitrogen concentration was not significantly affected by feeding the cows the RFMA.

TABLE 2

| Item | Control | Sodium Bicarbonate | RMFA | P |
|---|---|---|---|---|
| Dry Matter Intake kg/d | 26.3 | 26.4 | 26.7 | 0.97 |
| Milk Production kg/d | 40.3 | 41.3 | 40.4 | 0.88 |
| Milk Composition, % | | | | |
| Fat | 3.77 | 3.93 | 3.85 | 0.64 |
| Protein | 2.94 | 2.93 | 3.09 | 0.15 |
| Solids, non-fat | 8.71 | 8.85 | 8.95 | 0.29 |
| Milk, Urea Nitrogen mg/dL | 14.7 | 14.2 | 13.4 | 0.18 |

The ruminal pH results from this study are set forth in table 3. As is shown, the ruminal pH increased (P=0.11) in the group with the TMR diet with RMFA compared to the control group (6.42 vs. 6.61), but the ruminal pH in the group with the TMR diet with RMFA was similar to the ruminal pH for the cows that were the fed the TMR diet with sodium bicarbonate. Concentrations of ammonia nitrogen did not differ significantly among treatments. Feeding the RMFA tended to decrease total VFA production compared to the control group and the sodium bicarbonate group; whereas molar proportions of acetate and propionate were not significantly influenced by the treatments. Thus, the RMFA of the present application may be used to replace sodium bicarbonate as a ruminal buffer additive with certain advantages in performance and cost-effectiveness.

TABLE 3

| Item | Control | Sodium Bicarbonate | RMFA | P |
|---|---|---|---|---|
| Ruminal pH (4 hrs. post-feeding) | 6.42 | 6.54 | 6.61 | 0.11 |
| Total VFA, mM | | | | |
| Acetate | 62.8 | 62.5 | 63.9 | 0.37 |
| Proprionate | 22.4 | 22.0 | 21.6 | 0.74 |
| Butyrate | 10.8 | 11.0 | 10.5 | 0.17 |
| Valerate | 1.68 | 1.81 | 1.69 | 0.28 |
| Isobutyrate | 0.82 | 0.97 | 0.81 | <0.01 |
| Isovalerate | 1.17 | 1.39 | 1.18 | 0.02 |
| $NH_3$—N mg/dL | 10.7 | 11.6 | 11.7 | 0.58 |

Example No. 4

A Large Scale Dairy Trial was Run to Examine and Compare Performance of the Product of the Invention and Sodium Bicarbonate A dairy herd consisting of 750 cows was fed a diet with a forage content of 51 percent consisting of corn silage and alfalfa hay. Protein was about 17.5 percent and starch was 26.5 percent. Initial buffer treatment was sodium bicarbonate at 0.5 pounds per head per day for the months of September and October. Data were averaged for the entire 750 head dairy herd. The basal diet remained the same and RMFA was substituted for sodium bicarbonate at the same rate of inclusion for the months of November and December. Sodium bicarbonate was switched back for the month of January. The results of this trial are set forth in Table 4. The data show minor changes in milk protein through the trial. Milk production and the percent butterfat tended to increase when rations were changed to the RMFA. Upon switching back to sodium bicarbonate the milk production remained the same, however butterfat trended down from December levels. No statistical analyses were run on this trial. The data suggest that the RMFA is at least as good as sodium bicarbonate to maintain levels of milk production, butterfat, and protein. When the value of magnesium from the RMFA is added to the diet and projected costs are compared, advantages would accrue to the dairyman for use of the RMFA.

TABLE 4

| | Sodium Bicarbonate | | RMFA | | Sodium Bicarbonate |
|---|---|---|---|---|---|
| | Time Period | | | | |
| | September | October | November | Dececmber | January |
| Daily Milk (lbs.) | 77.9 | 77.2 | 79.2 | 80.2 | 80.2 |
| Butterfat % | 3.46 | 3.49 | 3.61 | 3.74 | 3.65 |
| Protein % | 3.10 | 3.17 | 3.13 | 3.11 | 3.17 |

Although the present application has been described with respect to small prills, it should be understood that the RMFA may be utilized in the form of range blocks that that can be set out for animals to consume.

Advantages of the products and methods of the subject application include: (1) the acid consuming capacity is equal or higher than sodium bicarbonate; (2) carbon dioxide is not produced as a decomposition gas; (3) cost effectiveness is improved; (4) calcium and magnesium are provided as bio-available byproducts from acid neutralization; (5) the zeolite component provides for ammonium ion buffering and mycotoxin binding; (6) the prilled product is non-dusty and blends well with feeds without segregating or separating out; (7) the prills are palatable and have no residual or negative after-taste; and (8) dolomitic hydrated lime is converted from a harsh chemical to a benign and beneficial product for animal consumption.

It is apparent that an invention with significant advantages has been described and illustrated. The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. Although the present invention is shown in a limited number of forms, it is not limited to just these forms, but is amenable to various changes and modifications without departing from the spirit thereof.

I claim:

1. A ruminant mineral feed additive, consisting essentially of:
    a natural zeolite mineral; and
    a dolomitic hydrated lime;
    wherein the natural zeolite mineral and the dolomitic hydrated lime are mechanically and chemically combined to control pH, to provide bio-available calcium and magnesium, to provide mycotoxin binding, and to provide ammonium buffering, in an animal rumen and lower digestive tract.

2. The ruminant mineral feed additive according to claim 1, wherein the natural zeolite is clinoptilolite.

3. The ruminant mineral feed additive according to claim 1, wherein the natural zeolite is chosen from a group consisting of:
    phillipsite;
    mordenite;
    stilbite; and
    chabazite.

4. The ruminant mineral feed additive according to claim 1, wherein the ratio of the natural zeolite mineral to the dolomitic hydrated lime is about 60:40 by volume.

5. The ruminant mineral feed additive according to claim 1, wherein the natural zeolite mineral to the dolomitic hydrated lime are formed into prills having a nominal diameter between about 12 mesh and about 100 mesh.

6. The ruminant mineral feed additive according to claim 1, wherein the natural zeolite mineral to the dolomitic hydrated lime are heated to at least 200 degrees F. for a minimum of about 4 minutes to effect a hydrothermal reaction.

7. The ruminant mineral feed additive according to claim 6, wherein the hydrothermal reaction occurs in the following steps:
    (a) magnesium cation exchange onto zeolite crystalline material;
    (b) synthesis and growth of magnesium clinoptilolite crystals; and
    (c) pozzolanic annealing of solid components into a dry, rigid, semi-spherical prill.

8. The ruminant mineral feed additive according to claim 1, wherein the combination of the natural zeolite mineral and the dolomitic hydrated lime has about 7 percent magnesium by weight and about 12 percent calcium by weight.

9. The ruminant mineral feed additive according to claim 8, wherein the combination of the natural zeolite mineral and the dolomitic hydrated lime is in the form of a hard, dry, generally spherical prill with the majority of particles between about 12 mesh and about 100 mesh.

10. A method of manufacturing a ruminant mineral feed additive, consisting essentially of:
    blending a natural zeolite mineral with a dolomitic hydrated lime into a dry mixture;
    combining the dry mixture with an aqueous solution to form prills; and
    drying the prills at an elevated temperature for a selected duration of time to create a hydrothermal reaction.

11. The method according to claim 10, wherein the dry mixture has a ratio of natural zeolite mineral to dolomitic hydrated lime of about 60:40 by volume.

12. The method according to claim 10, wherein the elevated temperature is in a range of about 200 degrees F. to about 400 degrees F.

13. The method according to claim 12, wherein the elevated temperature is about 230 degrees F.

14. The method according to claim 10, wherein the duration of time is about 4 minutes.

15. The method according to claim 10, wherein the hydrothermal reaction is a pozzolanic reaction that exchanges magnesium ions into the molecular structure of the natural zeolite mineral, bonds the natural zeolite mineral to the dolomitic hydrated lime, resulting in a nutritional product in a prilled form that is conducive for mixing with feedstuffs.

16. The method according to claim 10, wherein the hydrothermal reaction produces an alkaline earth exchanged zeolite and co-products beneficial for rumen digestion.

17. The method according to claim 10, wherein the prills have an acid consuming capacity of at least 10 milliequivalents (mEq) of hydrogen ion per gram and contain not less than about 4 percent magnesium.

* * * * *